United States Patent [19]
Sandvik

[11] 3,795,305
[45] Mar. 5, 1974

[54] BUCKET CONVEYOR SYSTEM

[75] Inventor: Leonard E. Sandvik, Cedar Falls, Iowa

[73] Assignee: Universal Industries, Black Hawk, Iowa

[22] Filed: Jan. 22, 1973

[21] Appl. No.: 325,894

[52] U.S. Cl. .................................. 198/145, 198/148
[51] Int. Cl. ............................................ B65g 17/16
[58] Field of Search .................... 198/145, 148, 150

[56] References Cited
UNITED STATES PATENTS
3,312,333   4/1967   Anderson ........................... 198/145
1,518,951   12/1924  Andrus ............................... 198/148
3,055,486   9/1962   Meyer ................................ 198/145

FOREIGN PATENTS OR APPLICATIONS
272,304   6/1927   Great Britain ..................... 198/145

Primary Examiner—Evon C. Blunk
Assistant Examiner—Joseph E. Valenza
Attorney, Agent, or Firm—Zarley, McKee & Thomte

[57] ABSTRACT

A bucket conveyor system comprising a support housing having a plurality of sprockets rotatably mounted therein having first and second chains looped therearound. A plurality of tiltable buckets are supported by the chains and are adapted to be moved between an inlet portion of the housing to a discharge portion of the housing. Each of the buckets has a pair of support arms extending from the upper center portion thereof which are secured to the chains. A large control wheel is secured to each of the buckets at the lower center portion thereof for engagement with a track provided in the support housing to control the attitude of the bucket. The control wheels of adjacent buckets are positioned on opposite ends of the respective buckets. Means is also provided on the support housing for dumping the buckets at the discharge portion of the housing.

11 Claims, 7 Drawing Figures

PATENTED MAR 5 1974 3,795,305
SHEET 1 OF 3
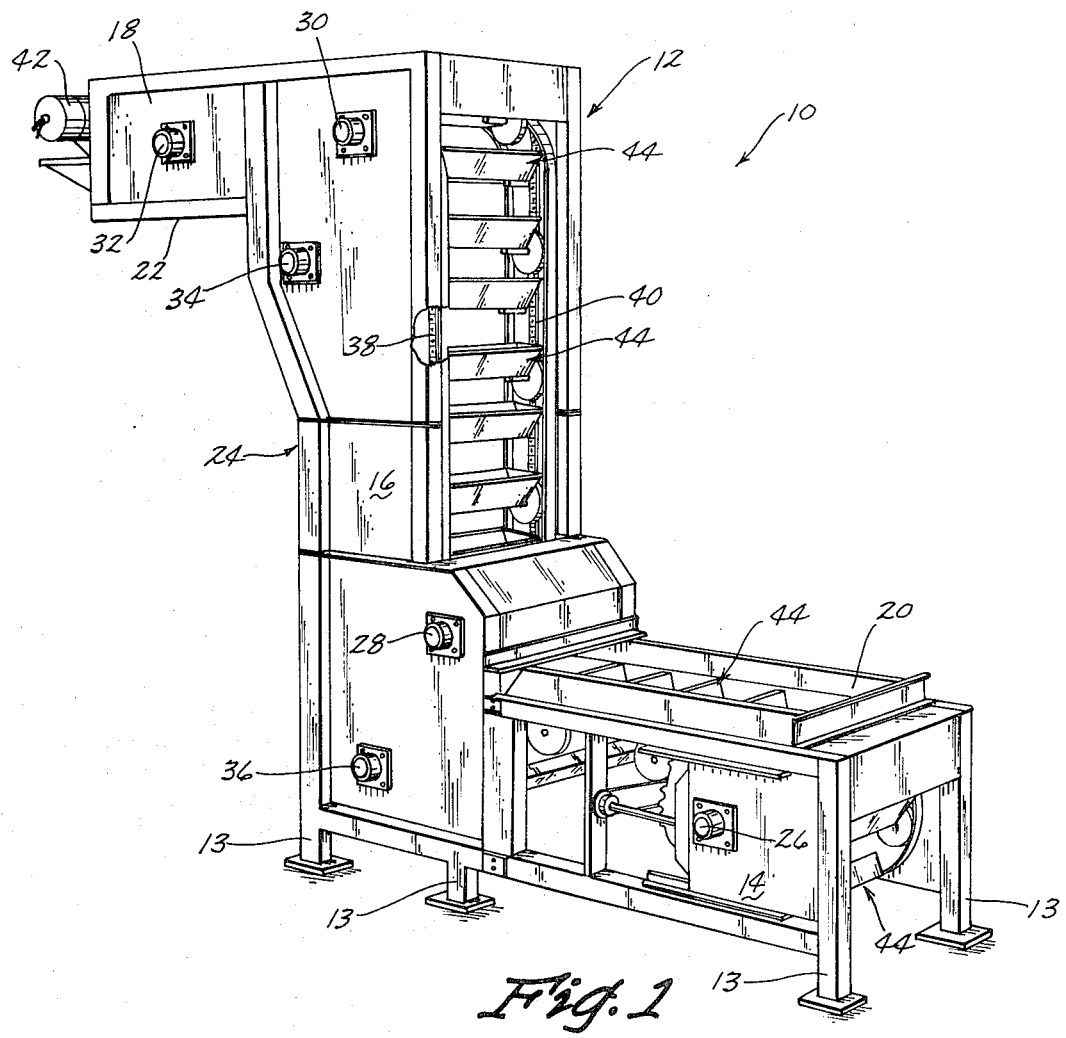
Fig. 1
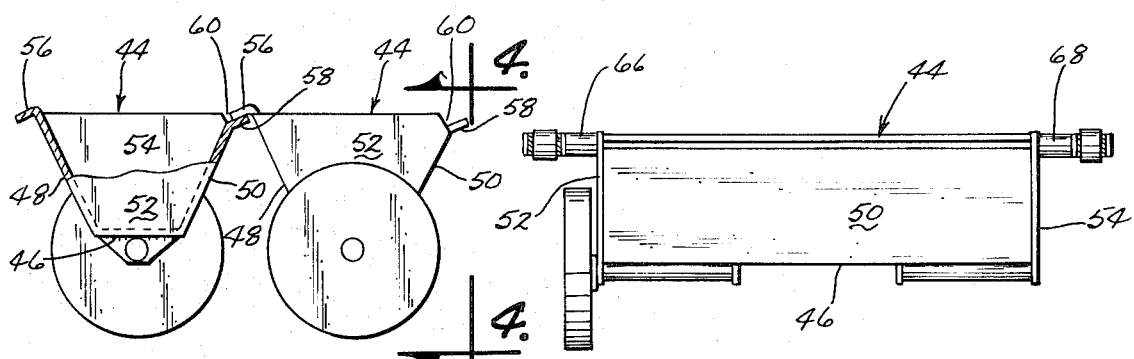
Fig. 3
Fig. 4

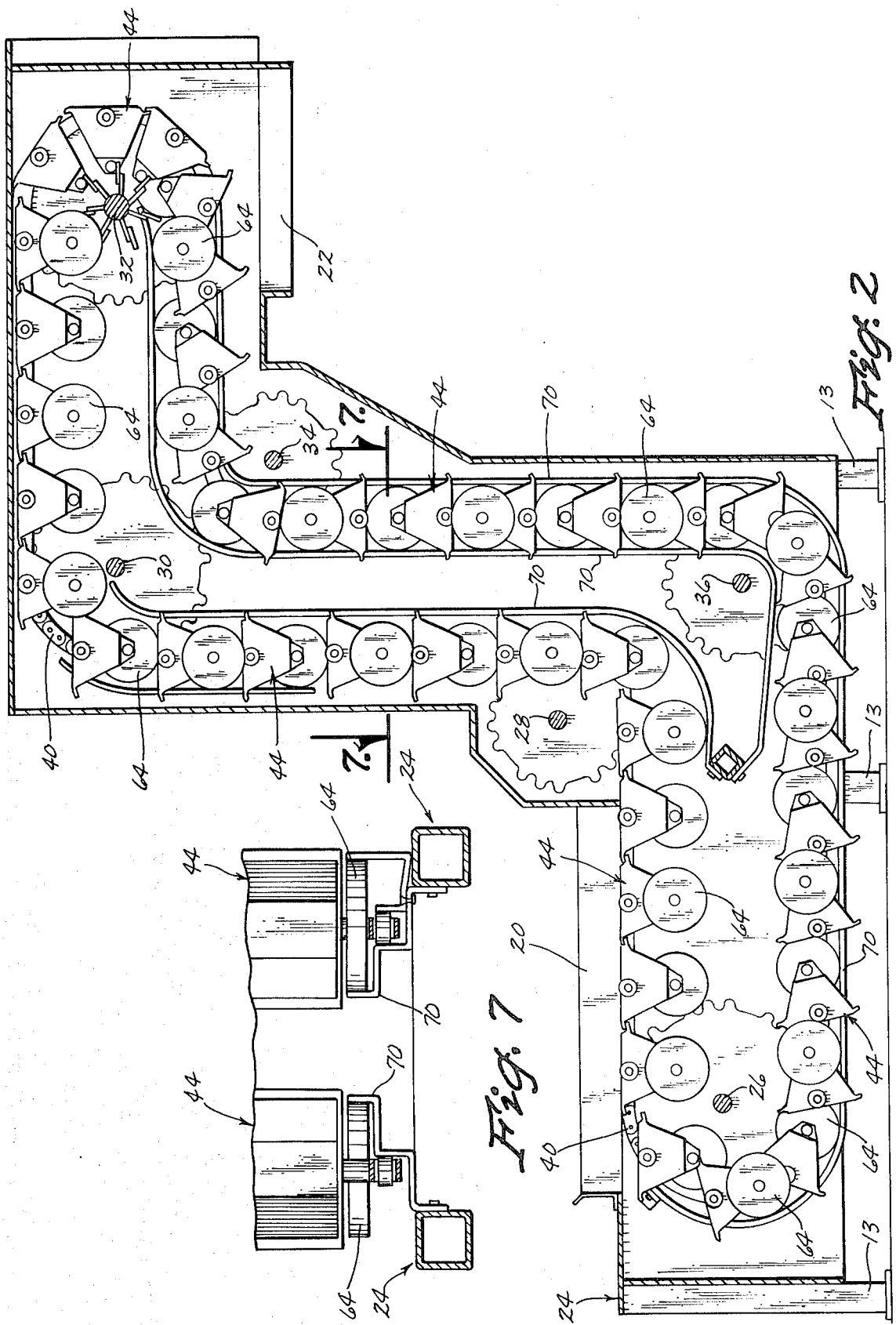

BUCKET CONVEYOR SYSTEM

BACKGROUND OF THE INVENTION

Bucket conveyor systems have long been used for conveying materials. In any bucket conveyor system, it is necessary to control the attitude of the tiltable buckets during various positions of their travel. One solution to the problem of controlling the attitude of the buckets is to provide one, two or three small control wheels at the opposite lower ends of each of the buckets with the upper ends of the bucket being secured to spaced apart chains. The small control wheels have proved to be extremely troublesome in that they are not durable and that they frequently cause the system to jam. The small control wheels presently used frequently bind as they pass around sprockets, etc. Additionally, the existing bucket conveyor systems do not have satisfactory means for causing the upper adjacent edges of the buckets to mate to prevent material from passing downwardly therebetween as the material is deposited on the buckets.

Therefore, it is a principal object of the invention to provide an improved bucket conveyor system.

A further object of the invention is to provide a bucket conveyor system comprising a plurality of tiltable buckets with the buckets having a large control wheel rotatably mounted thereon.

A further object of the invention is to provide a bucket conveyor system wherein the buckets have means on their upper adjacent edges to insure proper mating thereof.

A further object of the invention is to provide a bucket conveyor system having means thereon for causing the buckets to be dumped or tilted at the proper time.

A further object of the invention is to provide a bucket conveyor system which substantially eliminates any possibility of jams.

A further object of the invention is to provide a bucket conveyor system which is durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the bucket conveyor system of this invention:

FIG. 2 is a side elevational view of the system illustrating the position of the buckets:

FIG. 3 is an end view of a pair of buckets:

FIG. 4 is a front view of a bucket:

FIG. 7 is a sectional view seen on lines 7 — 7 of FIG. 2.

DESCRIPTION OF THE PREFERRED EMBODIMENT

Figure 5:
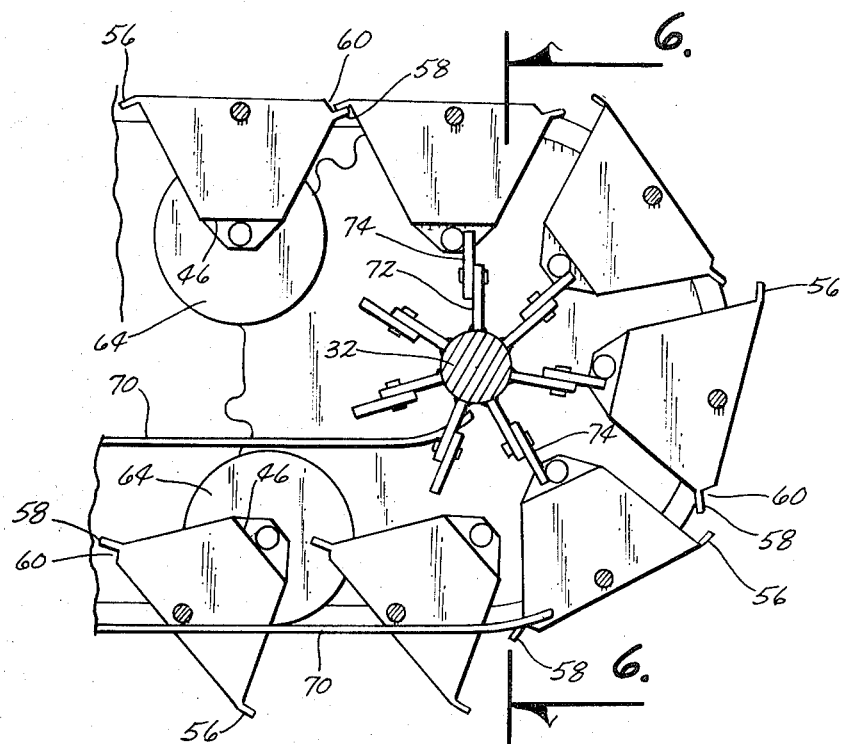
FIG. 5 is a vertical sectional view illustrating the apparatus for dumping the buckets.
Figure 6:
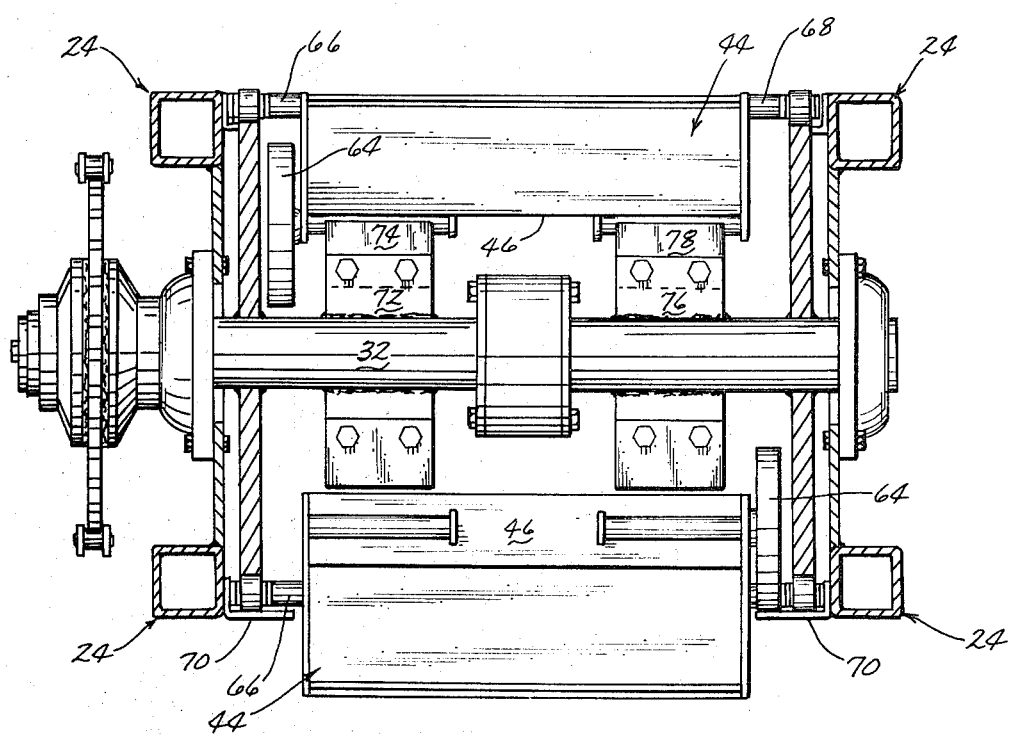
FIG. 6 is a sectional view seen on lines 6 — 6 of FIG. 5.

The numeral 10 refers generally to the bucket conveyor system of this invention generally comprising a support housing 12 supported by legs 13. For purposes of description, support housing 12 will be described as having a lower horizontal portion 14, intermediate vertical portion 16 and upper horizontal portion 18. An inlet opening 20 is provided in the upper portion of the lower horizontal portion 14 for depositing the material to be conveyed into the system. A hopper (not shown) would normally be secured to the housing 12 at the inlet opening to facilitate the depositing of the material into the housing. A discharge opening 22 is provided in the lower portion of upper horizontal portion 18 through which the material is dumped into a suitable receptacle or other conveyor as desired.

Support housing 12 includes a conventional frame means 24 upon which are mounted shafts 26, 28, 30, 32, 34 and 36 having suitable sprockets provided on the opposite ends thereof for supporting a pair of spaced apart chains 38 and 40 looped therearound. An electric motor 42 is operatively connected to the shaft 32 to cause the rotation thereof to drive the chains. The opposite ends of the various shafts are supported by conventional bearings.

A plurality of buckets 44 are secured to the chains 38 and 40 as illustrated in the drawings. For purposes of description, each of the buckets 44 will be described as comprising a bottom 46, front wall 48, back wall 50 and opposite sides 52 and 54 which extend between the walls 48 and 50. Front wall 48 is provided with a lip portion 56 which extends downwardly therefrom as illustrated in FIG. 3. Preferably, front wall 48 is disposed at approximately an angle of 116° with respect to the plane of bottom 46. Preferably, lip portion 56 extends from the upper end of front wall 48 at approximately at a 90° angle. Preferably, back wall 50 is deposed at approximately an angle of 116° with respect to the plane of bottom 46. A lip portion 58 is provided on the upper end of back wall 50 which extends upwardly and outwardly therefrom so as to be substantially parallel to the lip portion 56 on the adjacent bucket as illustrated in FIG. 3. The opposite sides 52 and 54 are each provided with a notch 60 formed in its upper rearward end to prevent engagement of the forward end of the lip portion 56 with either of the side walls.

Each of the buckets 44 has a shaft 62 secured to the underside of bottom 46 adjacent one side thereof and which extends outwardly therefrom. The shafts 62 are secured to the buckets 44 in an alternate arrangement so that adjacent buckets have the shafts secured to opposite ends thereof as illustrated in the drawings. Control wheel 64 is rotatably mounted on the outer end of shaft 62 and is maintained thereon by any suitable means. To achieve the necessary relationship between the control wheel 64 and the bucket 44, it is preferred that the control wheel have a diameter of 4.75 inches. Bottom 46 preferably has a width of 2.50 inches and a length which is dependent upon the particular type of conveyor system being utilized. Additionally, the upper end of the bucket 44 preferably has a width of 5.50 inches with the length of the lip portions 56 and 58 being approximately ½ inch. The height of front wall 48 is preferably 3.44 inches with the height of the back wall 50 being approximately 3.00 inches. Roller arms 66 and 68 are secured to the upper central portion of sides 52 and 54 respectively and are secured to the chains 38 and 40 respectively by any suitable means to permit the buckets 44 to be conveyed thereby and to tilt with respect thereto.

The normal method of operation is as follows. The buckets 44 are mounted on the chains 38 and 40 as previously described and are moved in the path indicated by the arrows in FIG. 2. The material to be conveyed is deposited in the inlet opening 20 as the buckets 44 are moved there past. The lip portions 58 and 60 of adjacent buckets 44 overlap in the manner illustrated in FIG. 3 to prevent material from passing downwardly between the adjacent buckets. The relationship of the overlapping lip portions 56 and 58 is such that it does not matter if the lip portion 56 of the trailing bucket is positioned above or below the lip portion 58 of the leading bucket. This feature insures that material will not drop downwardly between the adjacent buckets and prevents binding and jamming of adjacent buckets as is the case in conventional conveyor bucket systems.

The buckets 44 are moved in the path illustrated by the arrows in FIG. 3 with the control wheels 64 of the buckets 44 engaging suitable guide tracks 70 provided on the support housing outwardly of the chains 38 and 40. The engagement of the control wheels 64 with the guide track 70 maintains the buckets 44 in the desired attitude to prevent the material therein from being dumped until the proper time and to return the buckets to the inlet opening in an attitude which substantially decreases the drag on the system. The large diameter of the control wheels 64 greatly increases the control supplied to the buckets and prevents jamming of the system as the buckets are passed around the various sprockets within the support housing.

An apparatus is provided within the support housing for causing the buckets 44 to be dumped as they pass around the sprockets mounted on the opposite ends of the shaft 32 and such apparatus is illustrated in FIG. 5. A plurality of spaced apart fins 72 are secured to shaft 32 adjacent one end thereof and extend radially outwardly therefrom. A resilient member 74 is secured to the outer end of each of the fins 72 as illustrated in the drawings for engagement with the shaft 62 of the bucket 44 as the bucket passes around the upper end of this system. Since the control wheels 64 are secured to opposite ends of adjacent buckets 44, it is necessary to provide a plurality of fins 76 on the other end of the shaft 76. Resilient members 78 are secured to the fins 76 for engagement with the shafts 62 of the buckets. Thus, as the buckets pass around the shaft 32, the resilient members 74 and 78 cause these buckets to be pivotally or tiltably moved so that the contents are dumped from the buckets through the discharge opening 22.

It can be seen from the foregoing that a unique bucket conveyor system has been provided which substantially reduces jams within the system by providing a very large control wheel at one end of the buckets. It also can be seen that the relationship of the control wheel and the bucket is such that the jams will be eliminated and so that the drag within the system is reduced. The means for dumping the buckets also insures that the buckets will be efficiently dumped without causing the jamming of the same. Thus it can be seen that the bucket conveyor system accomplishes at least all of its stated objectives.

I claim:

1. A bucket conveyor system comprising,
    a support means,
    a plurality of sprockets rotatably mounted on said support means,
    first and second chains looped around said sprockets,
    a plurality of tiltable buckets supported by said first and second chains,
    each of said buckets comprising a top and a bottom and opposite ends, first means tiltably connecting one end of said bucket at the top center thereof to said first chain, second means tiltably connecting the other end of said bucket at the top center thereof to said second chain and a control wheel operatively rotatably secured to the center bottom of said bucket at least at one end thereof so as to be positioned outwardly of said one end,
    and control wheel guide means on said support means for controlling the attitude of said buckets along the path of travel thereof.

2. The bucket conveyor of claim 1 wherein said control wheel has a diameter which is substantially equal to the top width of said bucket.

3. The bucket conveyor of claim 1 wherein said control wheel has a diameter which is greater than the depth of said bucket.

4. The bucket conveyor of claim 1 wherein only a single control wheel is secured to each of said buckets, the control wheels of adjacent buckets being positioned on opposite ends of said buckets.

5. The bucket conveyor of claim 1 wherein each of said control wheels has a diameter which is approximately 4.75 inches and wherein each of said buckets has a top width of approximately 5.50 inches.

6. The bucket conveyor of claim 1 wherein each of said buckets has leading and trailing upper edges, first and second inclined lips extending outwardly from the leading and trailing edges respectively, said first and second inclined lips being disposed in substantially parallel planes.

7. The bucket conveyor of claim 6 wherein said first lip extends downwardly and outwardly from said leading edge, said second lip extending upwardly and outwardly from said trailing edge.

8. The bucket conveyor of claim 7 wherein said first lip extends downwardly at an angle of approximately 26° with respect to the horizontal.

9. The bucket conveyor of claim 1 wherein said guide means comprises means for dumping said buckets at a predetermined location on said support means, said means comprises a horizontally rotatable shaft disposed transversely to the direction of travel of said chains, a plurality of spaced apart radially extending fins extending from said shaft adapted to engage the bottoms of said buckets to move the buckets from a conveying position to a dumping position.

10. The bucket conveyor of claim 9 wherein said shaft is fully rotatable, said shaft being rotated by the engagement of said fins with the bottoms of said buckets.

11. The bucket conveyor of claim 10 wherein said fins have outer end portions which are comprised of a resilient material.

* * * * *